United States Patent [19]
Hallin

[11] 3,750,068
[45] July 31, 1973

[54] MAGNET ACTUATING ARRANGEMENT FOR A MAGNETO SENSITIVE DEVICE AND METHOD FOR PROVIDING

[75] Inventor: Robert W. Hallin, Freeport, Ill.
[73] Assignee: Honeywell Inc., Minneapolis, Minn.
[22] Filed: Nov. 28, 1969
[21] Appl. No.: 880,718

[52] U.S. Cl. .................................. 335/306, 324/45
[51] Int. Cl. ............................................. H01f 7/02
[58] Field of Search .................... 335/284, 302, 303, 335/304, 306; 324/45, 152

[56] References Cited
UNITED STATES PATENTS

| | | | |
|---|---|---|---|
| 2,698,917 | 1/1955 | Van Urk et al. | 335/302 |
| 3,233,950 | 2/1966 | Baermann | 335/306 X |
| 3,060,370 | 10/1962 | Varterasian | 324/45 X |
| 3,335,377 | 8/1967 | Kohlhagen | 335/284 |
| 3,340,468 | 9/1967 | Chu | 324/45 X |
| 3,409,853 | 11/1968 | Guerth | 335/284 |

FOREIGN PATENTS OR APPLICATIONS

| | | | |
|---|---|---|---|
| 804,694 | 4/1961 | Germany | 324/152 |
| 1,466,634 | 1/1969 | Germany | 324/152 |
| 776,209 | 6/1957 | Great Britain | 324/152 |

OTHER PUBLICATIONS

Bunn et al., Ceramic Permanent Magnets, Dec., 1960, pages 595–598.

Primary Examiner—George Harris
Attorney—Lamont B. Koontz and Philip J. Zrimsek

[57] ABSTRACT

A magnet actuating arrangement for a magneto sensitive device which incorporates a pair of facing magnets, parallel spaced to accommodate the device in the air gap therebetween, with each magnet including an opposite pair of magnet poles on the facing surface thereof each pole so arranged as to be of opposite polarity with respect to the facing pole of the other magnet. The magnets may include a three-dimensional controlled flux pattern.

3 Claims, 4 Drawing Figures

PATENTED JUL 31 1973    3,750,068

INVENTOR.
ROBERT W. HALLIN
BY
ATTORNEY

MAGNET ACTUATING ARRANGEMENT FOR A MAGNETO SENSITIVE DEVICE AND METHOD FOR PROVIDING

The present invention is directed to an improved magnet actuating arrangement for a magneto sensitive device which may be of the Hall effect type. The magnet actuating arrangement due to magnet orientation allows for the selective location and utilization of an effective zero flux region between two oppositely directed fields and provides a rather steep linear slope on the effective flux density curve so as to allow for better control of the actuating characteristics for the Hall effect device. Further, the present invention is directed to an arrangement as set forth above wherein a three-dimensional controlled flux pattern in the magnet structure is provided so as to increase useful or effective field density.

The usual manner of actuating Hall effect devices is of course by means of magnetic fields. If a bar magnet or a horseshoe magnet, for example, is utilized, as is normally the case, a rather large amount of relative travel between the Hall effect device and the magnet is required for any given change in output of the device due to the nonlinearity and rather flat slope of the field density curve of the magnet and the relative lack of an effective zero flux region exhibited by the magnet. Further, relatively large magnets of this type are required to provide the necessary flux to control the Hall effect device.

I have discovered a magnet actuating arrangement and a method for so providing which allows for reduced relative travel between a Hall effect device and the magnetic structure of the arrangement to cause the same given change in output of the device as above referred to and provides a more concentrated flux density than is the case with conventional magnet actuating arrangements. Thus, by associating a pair of high coercive magnets in substantially parallel spaced facing relationship and utilizing magnets with pairs of opposing poles on the facing surfaces thereof in an orientation such that the respective facing poles are of opposite polarity, a magnet actuating arrangement for a Hall effect device can be provided whereby the device, in moving relative to the air gap provided between the magnets, can be controlled. The location of the poles along the facing surfaces provides for an effective zero flux region between facing sets of poles whereat the field provided by the magnet actuating arrangement of course has no magnetic effect. Movement of the Hall effect device into this region will provide reversal of output of the device if such be required. Further, such a magnet actuating arrangement exhibits a rather steep slope of the flux density curve which is substantially linear. This of course allows for reduced travel necessary to cause a specific change in the output of the Hall effect device.

By concentrating the field density by means of a controlled flux pattern within the magnets, which pattern is three-dimensional in character, the flux pattern in the air gap is also controlled whereby I provide a magnetic actuating arrangement which is extremely efficient for any given size and retentivity of the magnets in terms of flux available at a selected, discrete location in the air gap. A method to provide such a pattern is disclosed.

It is therefore an object of the present invention to provide an actuating arrangement for a magneto sensitive device, for example of the Hall effect type, which comprises a pair of facing, parallel spaced magnets and which allows for selective location of poles and utilization of the effective zero flux region so as to provide for better control with a high degree of efficiency.

It is another object of the present invention to provide an arrangement as above set forth which includes a controlled three-dimensional flux pattern so as to provide a high field density in the air gap between the magnets.

It is a further object of the present invention to provide a method for producing a controlled flux pattern of a three-dimensional character in the magnet actuating arrangement.

These and other objects will become apparent from a reading of the following specification and claims taken in conjunction with the drawing wherein:

Figure 1:
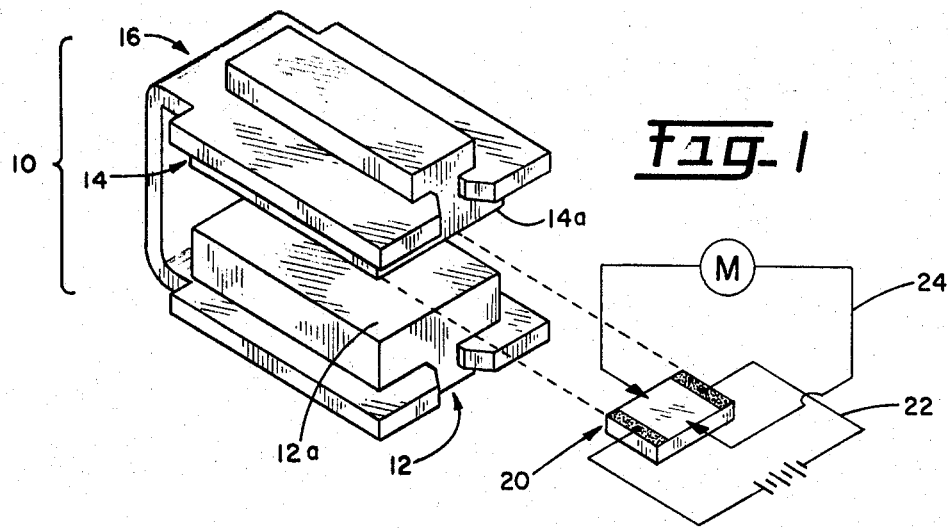
FIG. 1 is a perspective view of a two-magnet actuating arrangement for a Hall effect device incorporating the invention.
Figure 2:
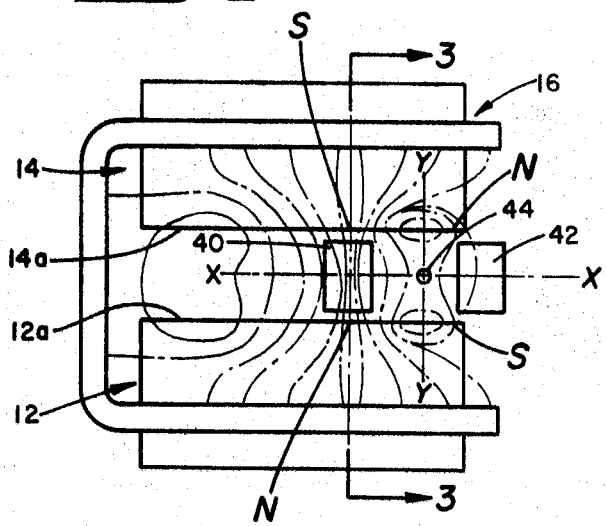
FIG. 2 is a side view of the arrangement of FIG. 1 showing pole orientation, maxiumum and zero flux regions and the form of the three-dimensional controlled flux pattern as well as means for bringing the foregoing about.
Figure 3:
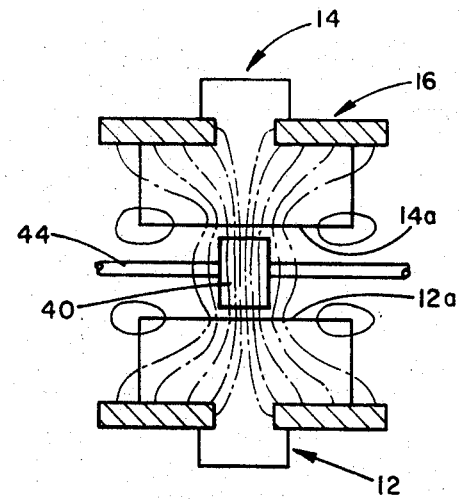
FIG. 3 is a view of the arrangement taken along line 3—3 of FIG. 2.

Referring to FIGS. 1–3 of the drawing, a magnet actuating arrangement 10 is comprised of a pair of bar magnets 12 and 14 which are appropriately affixed to a U-shaped support 16. The magnets 12 and 14 are of any high coercive material and in the proposed embodiment may be isotropic in form and barium ferrite in composition. To provide shielding for the magnets 12 and 14 from external magnetic effects and ferrous bodies, I prefer to have the support 16 formed of a ferrous material. Further, utilizing a ferrous support 16 also adds to the efficiency of the magnetic system by reducing external flux leakage, concentrating the flux therein and providing a low reluctance flux path between the magnets 12 and 14.

A magneto sensitive device which in the preferred embodiment is of the Hall effect type is shown at 20 on an enlarged scale for purposes of clarity. The Hall effect device is further shown with supply input connections 22 and voltage output connections at 24.

The magnet actuating arrangement 10 and the Hall effect device 20 are arranged to be moved relative to each other with the device moving in the air gap provided between the parallel spaced facing surfaces 12a and 14a of the magnets 12 and 14, respectively, so as to provide a control for the device 20.

By utilizing magnetic pole locations on the facing surfaces 12a and 14a of the magnets 12 and 24, respectively, as identified by the conventional nomenclature in FIG. 2, I have provided a magnetic actuating arrangement which exhibits a rather steep slope on the field density curve as opposed to that for a conventional bar magnet or horseshoe magnet. Thus, referring to FIG. 4, field density curves are plotted on a graph having gauss and travel as coordinates for a given bar magnet, curve A, and the magnet actuating arrangement 10, curve B. It will be noted because of the different slopes of the curves that for a particular change from one unit to six units gauss, that is, from point A' to point A" on curve A for the bar magnet, in excess of nine units of travel are required whereas for the same change in gauss in the magnet actuating arrangement 10, that is, from point B' to point B" on curve B only four units of travel are required. This of course means when the Hall effect device 20 is controlled by the magnet actuating arrangement 10, a small amount of relative travel is required therebetween to bring about the desired change in condition in the device as compared to that which would be required if the given bar magnet were utilized.

Figure 4:
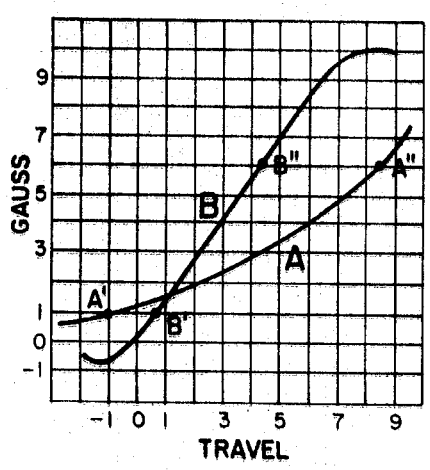
FIG. 4 is a graph plotting gauss versus travel showing the field density curves for a bar magnet and for the magnetic actuating arrangement incorporating the invention.

Further, by utilizing the magnet actuating arrangement 10 with the pole orientation as shown in FIG. 2, an effective zero flux region arises in the air gap between lines connecting the facing poles of the magnets 12 and 14, as at the intersection of lines X—X and Y—Y. In other words, in this region, the summation of the magnetic force provided by the magnets 12 and 14 is effectively zero. This is shown in FIG. 4 by curve B crossing the gauss coordinate at zero. It will be noted the magnet actuating arrangement 10 also exhibits a flux density curve including a negative portion. The effective zero flux region and the negative portion of the flux density curve allow for reversal of output of the Hall effect device if such is required. It will be noted from curve A of FIG. 4 that such reversal is not possible utilizing the bar magnet.

To provide the facing pole orientation in the magnets 12 and 14 and to achieve the effective zero flux region, I prefer to magnetize the magnets when in place in the support 16. The magnetization method I use comprises placing soft iron elements 40 and 42 in the air gap between the magnets 12 and 14, disposing an electrical conductor 44 between the elements, all as shown in FIGS. 2 and 3, and passing an electrical current through the conductor. The form and composition of the magnets 12 and 14, the form and location of the soft iron elements 40 and 42 and the character of the signal passed through the conductor 44 determine the form of the flux density curve as well as the flux pattern within the air gap. By utilizing such a method of magnetization, I can provide a three-dimensional flux pattern as shown in FIGS. 2 and 3, and by selective dimensioning, I can very closely control the form of the resultant pattern within the air gap. With the resultant flux pattern of the form shown in FIGS. 2 and 3, it is apparent that a concentration of flux has been achieved making for a more efficient magnet system in terms of usable flux than would be the case without the three-dimensional controlled pattern.

From the foregoing, it can be seen that I have provided a magnet actuating arrangement which allows for more precise control through the utilization of a controlled slope of the field density curve, the provision of effective zero flux region and a three-dimensional controlled flux pattern. Such a magnet actuating arrangement finds use with magneto sensitive devices where such control as just set forth is highly desirable.

Other forms of my invention are possible and therefore the scope of my invention should be determined from the following claims.

I claim:

1. A magnet actuating arrangement for a magneto sensitive device comprising: a pair of bar magnets formed of high coercive isotropic material located and secured in substantially parallel spaced facing relation for movement of a magneto sensitive device therebetween and each including a pair of opposite magnetic poles disposed along its facing surface so arranged as to be of opposite polarity with respect to the facing pole of the other magnet.

2. The arrangement of claim 1 wherein the magnets are so magnetized as to provide a controlled flux pattern between the opposite polarity facing poles thereof whereby the lines of flux converge in a three-dimensional pattern in the air gap between the magnets, the relative position of said poles and the magnitude thereof determining the location of the effective zero flux region of the arrangement.

3. The method of providing a controlled flux pattern in a magnet actuating arrangement for a magneto sensitive device of the type defined in claim 1 wherein the lines of flux converge in a three-dimensional pattern in the air gap between the magnets comprising: disposing a pair of soft iron elements in the air gap between the magnets along the facing surfaces one each to either side of a line connecting an opposite polarity facing pair of poles to be included; locating a conductor through the air gap and the opening provided between said soft iron elements and therebeyond; and passing an electrical current through said conductor.

* * * * *